United States Patent
Bian et al.

(10) Patent No.: US 6,599,642 B2
(45) Date of Patent: *Jul. 29, 2003

(54) HIGH ANISOTROPY ALLOY FOR THIN FILM DISK

(75) Inventors: Xiaoping Bian, San Jose, CA (US); Mary Frances Doerner, Santa Cruz, CA (US); Tim Minvielle, San Jose, CA (US); Mohammad Taghi Mirzamaani, San Jose, CA (US); Kai Tang, San Jose, CA (US)

(73) Assignee: Hitachi Global Storage Technologies Netherlands, B.V., Amsterdam (NL)

( * ) Notice: Subject to any disclaimer, the term of this patent is extended or adjusted under 35 U.S.C. 154(b) by 220 days.

This patent is subject to a terminal disclaimer.

(21) Appl. No.: 09/758,396

(22) Filed: Jan. 9, 2001

(65) Prior Publication Data

US 2001/0018136 A1 Aug. 30, 2001

Related U.S. Application Data

(63) Continuation-in-part of application No. 09/500,710, filed on Feb. 9, 2000.

(51) Int. Cl.$^7$ .............................. G11B 5/65; G11B 5/66
(52) U.S. Cl. .................. 428/611; 428/650; 428/668; 428/678; 428/65.6; 428/65.7; 428/336; 428/694 TS
(58) Field of Search .................. 428/611, 637, 428/650, 666, 667, 668, 678, 65.3, 65.6, 65.7, 336, 694 TS, 900

(56) References Cited

U.S. PATENT DOCUMENTS

| 5,523,173 A | * | 6/1996 | Doerner et al. ............. 428/611 |
| 5,605,733 A | * | 2/1997 | Ishikawa et al. ............ 428/65.3 |
| 5,693,426 A | | 12/1997 | Lee et al. .................... 428/611 |
| 5,700,593 A | * | 12/1997 | Okumura et al. ...... 428/694 TS |
| 5,736,262 A | * | 4/1998 | Ohkijima et al. ............ 428/611 |
| 6,010,795 A | * | 1/2000 | Chen et al. ................. 428/611 |
| 6,150,015 A | * | 11/2000 | Bertero et al. .............. 428/332 |
| 6,159,625 A | * | 12/2000 | Ueno ..................... 428/694 T |
| 6,183,832 B1 | * | 2/2001 | Margulies et al. ......... 428/65.3 |
| 6,383,667 B1 | * | 5/2002 | Futamoto et al. ...... 428/694 TS |
| 6,403,241 B1 | * | 6/2002 | Chen et al. ............ 428/694 TS |

OTHER PUBLICATIONS

Glijer, P., Sivertsen, J., Judy, J., IEEE Trans. Mag., 31(6), 1995, 2842–2844.*
Paik, C., Suzuki, I., Tani, N., Ishikawa, M., Ota, Y., and Nakamura, K., IEEE Trans. Mag., 28(5), 1992, 3084–3086.*

* cited by examiner

Primary Examiner—Paul Thibodeau
Assistant Examiner—Kevin M. Bernatz
(74) Attorney, Agent, or Firm—Robert O. Guillot; IPLO Intellectual Property Law Offices

(57) ABSTRACT

The thin film disk includes a pre-seed layer of amorphous or nanocrystalline structure which may be AlTi or AlTa, and that is deposited upon a disk substrate. The pre-seed layer is followed by the RuAl seed layer, a Cr alloy underlayer, an onset layer composed essentially of CoCr and a magnetic layer. The magnetic layer is comprised of $CoPt_xCrB_y$, wherein x is the at. % concentration of Pt, y is the at. % concentration of boron, and $x > 4 + y$.

44 Claims, 5 Drawing Sheets

HIGH ANISOTROPY ALLOY FOR THIN FILM DISK

CROSS REFERENCE TO RELATED APPLICATIONS

This application is a continuation-in-part of U.S. patent application Ser. No. 09/500,710, filed on Feb. 9, 2000 now pending, and entitled "NON-METALLIC THIN FILM MAGNETIC RECORDING DISK WITH PRE-SEED LAYER".

BACKGROUND OF THE INVENTION

The use of a RuAl seed layer, which is included in the preferred embodiment discussed below, is described in a commonly assigned, co-pending U.S. patent application with Ser. No. 09/295,267. The use of an onset layer, which is included in the preferred embodiment discussed below, is described in a commonly assigned, co-pending U.S. patent application with Ser. No. 08/976,565 which issued as U.S. Pat. No. 6,143,388 entitled "Thin Film Disk with Onset Layer." U.S.P.T.O application Ser. No. 09/020,151 which issued as U.S. Pat. No. 6,174,582, entitled "THIN FILM MAGNETIC DISK HAVING REACTIVE ELEMENT DOPED REFRACTORY METAL SEED LAYER" is mentioned below.

1. Field of the Invention

This invention relates generally to the field of thin film materials used in magnetic disks for data storage devices such as disk drives. More particularly the invention relates to the use of a high anisotropy alloy to form the magnetic layer on a thin film disk.

2. Background of the Invention

The magnetic recording disk in a conventional drive assembly typically consists of a substrate, an underlayer consisting of a thin film of chromium (Cr) or a Cr alloy, a cobalt-based magnetic alloy deposited on the underlayer, and a protective overcoat deposited on the magnetic layer. A variety of disk substrates such as NiP-coated AlMg, glass, glass ceramic, glassy carbon etc., can be used. Disks that are commonly available in the market are made with an AlMg substrate on which a layer of amorphous NiP is electrolessly deposited. While a coating on the substrate is important because such a coating gives uniform magnetic read-back signals during the course of a disk revolution, the process of electroless deposition of NiP on an AlMg substrate has several disadvantages, one of them being the fact that electroless deposition is a wet process. The wet nature of the process necessitates that it be performed quite separately from the sputtering process by which the remainder of the layers in a magnetic recording disk is deposited. A NiP layer has other disadvantages too. For instance, with a NiP layer, it is difficult to achieve the smoothness and uniformity in the NiP surface of the magnetic recording disk, which is a prerequisite for the high densities required in current disk drives. Yet another problem associated with the NiP surface is corrosion. The NiP surface also tends to limit the processing temperatures because of its tendency to become magnetic if heated beyond a certain point.

Further, in cases where a non-metallic substrate such as glass is chosen, the conventional NiP coating is not preferable for use on glass as pre-seed layer for many reasons including those noted above. In such cases, the non-metallic substrate disks typically have a so called "seed layer" sputter deposited onto the substrate between the substrate and the Cr-alloy underlayer. The selection of the seed layer allows the performance of non-metallic substrates to exceed the magnetic recording characteristics of NiP/AlMg disks because the seed layer of the magnetic disk drive influences nucleation and growth of the underlayer which in turn affects the recording characteristics of the magnetic layer. Several materials have been proposed in published papers for seed layers such as: Al, Cr, CrNi, Ti, $Ni_3P$, MgO, Ta, C, W, Zr, AlN and NiAl on glass and non-metallic substrates. (See for example, "Seed Layer induced (002) crystallographic texture in NiAl underlayers," Lee, et al., J. Appl. Phys. 79(8), 15 April 1996, p.4902ff). In a single magnetic layer disk, Laughlin, et al., have described use of a NiAl seed layer followed by a 2.5-nm thick Cr underlayer and a CoCrPt magnetic layer. The NiAl seed layer with the Cr underlayer was said to induce the [$10\bar{1}0$] texture in the magnetic layer. ("The Control and Characterization of the Crystallographic Texture of Longitudinal Thin Film Recording Media," IEEE Trans. Magnetic. 32(5) September 1996, 3632). In one of the related applications noted above, the use of RuAl for a seed layer is disclosed.

A Cr underlayer is mainly used to influence such microstructural parameters as the preferred orientation (PO) and grain size of the cobalt-based magnetic alloy forming the onset layer. When the Cr underlayer is deposited at elevated temperature on a NiP-coated AlMg substrate a [100] PO is usually formed. A PO of the underlayer promotes the epitaxial growth of [$11\bar{2}0$] PO of the hcp cobalt (Co) alloy forming the onset layer, thereby improving the in-plane magnetic performance of the disk for longitudinal recording. The [$11\bar{2}0$] PO refers to a film of hexagonal structure whose ($11\bar{2}0$) planes are predominantly parallel to the surface of the film. Since nucleation and growth of Cr or Cr alloy underlayers on glass and most non-metallic substrates differ significantly from those on NiP-coated AlMg substrates, different materials and layer structures are used on glass substrate disks to achieve optimum results.

The design of magnetic disks has advanced rapidly in recent years and even 1 dB improvement in the Signal-to-Noise Ratio (SNR) is now considered quite significant. Recording density of magnetic disks as high as 30 to 40 gigabits per square inch has been achieved in the industry; however, this density has only been achieved in the laboratory and the density found in state of the art commercially available disk drives is far below this value. The recording density of a disk is also dependent on the thermal stability of the recorded information on the disk because a commercially viable disk drive must be capable of maintaining the stored information for periods of time measured in years.

The use of Co alloys to form the magnetic layer of a magnetic disk has been discussed by Ishikawa et al. in Magn, Mater, 152 pp 265–273 (1996). The article mentions that the density of stacking faults increases with addition of Pt in CoPtCr. A maximum in coercivity was observed at 12 at % Pt. At higher Pt concentrations, the decrease in magnetocrystalline anisotropy (Ku) due to stacking faults and formation of FCC phase overcomes the increase in Ku associated with higher Pt concentration in the lattice.

Similarly, Inaba et al. in IEEE. Trans, Magn 34, pp 1558–1560 (1990) have discussed that the use of Cr in the magnetic layer decreases the Ku of Co alloys. However, Cr is added because of its tendency to segregate to the grain boundaries and magnetically isolate the grains. Therefore, a need exists for an optimization of the desired concentration of metals forming the magnetic layer alloy of a disk so as to increase coercivity and reduce stacking faults.

SUMMARY OF INVENTION

The thin film disk of the invention includes a thin film pre-seed layer of amorphous or nanocrystalline structure.

The pre-seed layer which may be CrTa or AlTi or AlTa, is deposited prior to a first crystalline layer. Although the pre-seed layer may be amorphous or nanocrystalline, for brevity it will be referred to herein as amorphous which is intended to encompass a nanocrystalline structure. In the preferred embodiment of the present invention, a pre-seed layer is sputtered onto a non-metallic substrate such as glass, followed by a ruthenium-aluminum (RuAl) seed layer with B2 structure. The use of the pre-seed layer improves grain size and its distribution, in-plane crystallographic orientation, coercivity (Hc) and SNR. In a preferred embodiment of the present invention, a pre-seed layer is followed by the RuAl seed layer, a Cr alloy underlayer, an onset layer and a magnetic layer. The amorphous pre-seed layer also allows use of a thinner RuAl seed layer which results in smaller overall grain size, as well as, a reduction in manufacturing cost due to relatively high cost of ruthenium. The increased coercivity also allows the use of a thinner Cr alloy underlayer, which also results in smaller overall grain size. Another benefit lies in the fact that the pre-seed layer provides additional thermal conductivity, which could help prevent thermal erasures on a glass disk. A cobalt based magnetic layer with an optimal concentration of Pt, B and Cr is also used to form the magnetic layer. Such an optimization produces high anisotropy, low noise, high coercivity and smaller grain size of the magnetic layer.

DETAILED DESCRIPTION OF THE PREFERRED EMBODIMENT

Figure 1:
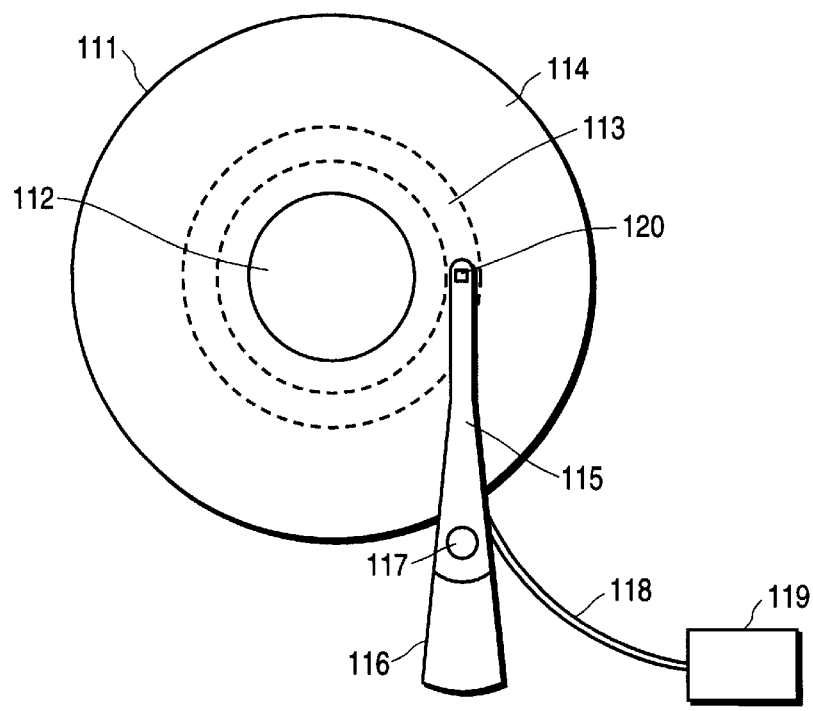
FIG. 1 is a top view of a disk drive illustrating the structural components of a disk drive with a rotary actuator as used in the present invention.

FIG. 1 is a top view illustrating a disk drive with a rotary actuator in which a thin film disk according to a preferred embodiment of the present invention may be used. The disk drive system includes one or more magnetic recording disks 111 mounted on a spindle 112, which is rotatable by an in-hub electrical motor (not shown). An actuator assembly 115 supports a slider 120, which contains one or more read/write heads. The actuator assembly 115 is composed of a plurality of actuators and sliders arranged in a vertical stack with the actuators supporting the sliders being in contact with the surfaces of the disks when the disks are not rotating or being unloaded to avoid contact. A voice coil motor (VCM) 116 moves the actuator assembly 115 relative to the disks by causing the assembly to pivot around a shaft 117. The read/write heads are typically contained in air bearing sliders adapted for flying above the surface of the disks when rotating at a sufficient speed. During the operation of the disk drive, if the sliders fly above the disks the VCM moves the sliders in an arcuate path across the disks so as to allow the heads to be positioned to read and write magnetic information from the circular tracks which are formed in the data area 114. The data area is coated with thin films as described below. Electrical signals to and from the heads and the VCM are carried by a flex cable 118 to drive electronics 119. When the disk drive is not operating and during such periods of time as when the rotation of the disks is either starting or stopping, the sliders may either be removed from the disks using load/unload ramps (not shown) or parked in physical contact with the surface of the disks in a landing zone or contact start/stop (CSS) area 113, which is not used for data storage even though the magnetic coating extends over this area. If the sliders are unloaded from the disks during non-operation, there is no need to have a CSS area and more of the disk becomes available for data storage. Although the disk drive has been described with air bearing sliders the disk of the present invention may easily be used in other storage devices having near contact, or contact recording sliders.

Figure 2:
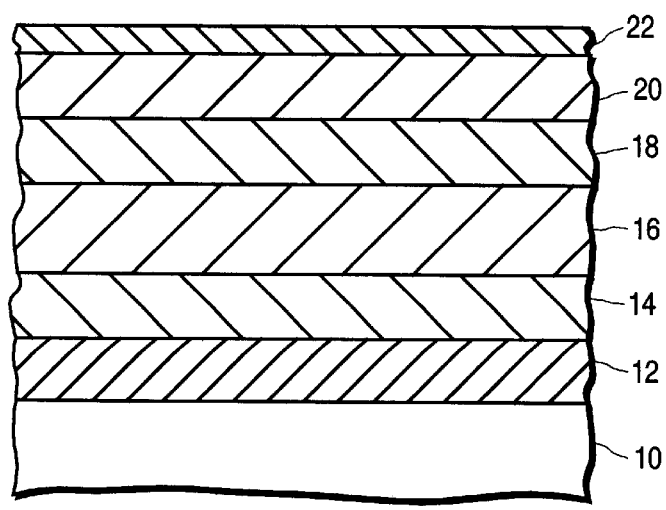
FIG. 2 is a diagram illustrating the layer structure of a thin film magnetic disk according to a preferred embodiment of the present invention.

FIG. 2 is a diagram illustrating the layer structure of a thin film magnetic disk according to a preferred embodiment of the present invention. The thin film layers are deposited onto at least one and preferably both planar surfaces of the magnetic disk to form the data recording area. The substrate 10 may be made of glass or any other suitable material.

A CrTa or AlTi or AlTa pre-seed layer 12 is first deposited onto the substrate. The pre-seed layer is deposited by conventional DC magnetron sputtering. The composition of the pre-seed layer is selected to produce a film with an amorphous or nanocrystalline structure. The use of a pre-seed layer improves the media coercivity for a film structure with very thin RuAl seed layer and ultra-thin Cr alloy underlayer.

The RuAl seed layer 14 is next deposited directly onto the pre-seed layer. The seed layer could also be a "double layer" with a layer of RuAl followed by a layer of NiAl, for example. This double layer configuration could result in cost savings by reducing the amount of Ru required. Ru is an expensive element, so a reduction in the required quantity of Ru will reduce the costs. In the double layer structure the RuAl seed layer establishes the grain size and orientation and the subsequently deposited NiAl follows the established patterns. An underlayer 16 is next deposited onto the seed layer 14 and is comprised of a non-ferromagnetic material such as a chromium alloy e.g CrV or CrTi. The underlayer 16 is followed by a Co-alloy onset layer 18 and a CoPtCrB magnetic layer 20. The use of an onset layer 18 is described in a commonly assigned, co-pending U.S. patent application with Ser. No. 08/976,565. Typically, the onset layer material is selected in part for its lattice match with the underlayer. Lattice parameters, which are intermediate between that of the underlayer 16 and the magnetic layer 20 may strengthen the epitaxy of the grains in the desired orientation. The preferred onset layer 18 is of hexagonal close packed (hcp) structured ferromagnetic material. Materials, which are suitable to form the onset layer, include a wide range of cobalt alloys such as CoNiCr, CoCrTa, etc. Nonmagnetic materials such as CoCr (Cr>30 at. %) can also be used as onset layers. An onset layer 18 is typically 1–4 nm thick.

A preferred embodiment of the present invention has a magnetic layer 20 deposited on the onset layer. The magnetic layer is an alloy of cobalt, which typically contains platinum and chromium and may contain additional elements such as tantalum or boron, e.g. CoPtCrTa or CoPtCrB. A typical magnetic layer might comprise 12 to 20 at. % platinum, 16 to 20 at. % chromium and 6 to 10 at. % boron with cobalt forming the remainder of the magnetic layer. In accordance with a preferred embodiment of the present invention, the thickness of the magnetic layer can be from 5–30 nm with 10–20 nm being the preferred thickness range. The use, composition and thickness of an overcoat 22 are not critical in practicing the invention, but a typical thin film disk might use an overcoat less than 15 nm thick.

While the compositions listed above have been given without regard to contamination percentages, it is known to those skilled in the art that some contamination is normally, if not always, present in thin films. Sputtering targets are typically specified as 99.9% or greater purity, but the resulting films may have much lower purity due to contamination in the sputtering chamber or other factors. For example, contamination by air in the chambers might result in measurable amounts of oxygen and/or hydrogen being incorporated into the film. It is also known that some small amount of oxygen is normally found in Cr targets and in the resulting Cr layer. It is also possible for small amounts of the working gas in the sputtering system, e.g. argon, to be incorporated into a sputtered film. Contamination levels were not specifically measured in the disk samples described and, therefore, were assumed to be within normal ranges for sputtered thin film disks expected by those skilled in the art.

The thin film disk made according to the invention can be used for storing data in typical disk drives using either magnetoresistive or inductive heads and can be used in contact recording or with flyable heads. The read/write head is positioned over the rotating disk in a standard manner to either record or read data.

In general, the application of some type of seed layer on glass and other alternate substrates to control nucleation and crystallographic orientation of the Cr (or Cr alloys), and thereby the magnetic Co-alloy layer is well known. U.S. Pat. No. 5,789,056 disclosed that the use of a very thin seed layer and underlayer on glass media reduce the grain size of magnetic alloy substantially, thereby improving SNR. By applying different compositions of seed layers, crystallographically textured (112) or (100) Cr layer can be deposited. By sputtering Co-alloys on these Cr underlayers, textures of either ($10\bar{1}0$) or ($11\bar{2}0$) in the magnetic layer can be achieved. For high deposition rate sputtering, it has been found that the application of an amorphous TaN seed layer on glass induces a (100) orientation in the subsequently grown Cr underlayer, which promotes a strong ($11\bar{2}0$) orientation in the Co-alloy layer. (See U.S.P.T.O application Ser. No 09/020,151, filed: Feb. 6, 1998, THIN FILM MAGNETIC DISK HAVING REACTIVE ELEMENT DOPED REFRACTORY METAL SEED LAYER). However, the formation of TaN layer requires a reactive atmosphere in the sputtering chamber and, therefore, increases the difficulty encountered in sputtering. The ($11\bar{2}0$) texture of a Co-alloy layer can also be obtained by depositing a relatively thick RuAl seed layer, but the high cost of RuAl sputtering targets is a major drawback for its use in large scale manufacturing. The use of a CrTa pre-seed layer allows the use of a very thin RuAl seed layer (and thus reduces cost) and an ultra-thin Cr (or Cr-alloys) underlayer on a glass substrate, which in turn enables the subsequent growth of strong ($11\bar{2}0$) oriented Co-alloy onset layer with controlled smaller grain size.

In accordance with a preferred embodiment of the present invention, the pre-seed layer 12 is sputter deposited onto a glass substrate 10 followed by a thin RuAl seed layer 14, an ultra-thin Cr-alloy underlayer 16, a Co-alloy onset layer 18 and a CoPtCrB magnetic layer 20. In order to enhance the lattice match between the RuAl seed layer and the Cr-alloy underlayer, CrTi or CrMo alloys may be preferred to form the underlayer. A CrMo underlayer is also advantageous because it helps render the SNR less sensitive to changes in the thickness of the underlayer. Magnetic properties and SNR data for disks with and without a CrTa and AlTi pre-seed layer are listed in Table-1 for a comparison.

TABLE 1

| | Disk Structure | Hc (Oe) | Mrt | S* | SoNR (dB) |
|---|---|---|---|---|---|
| 1 | $RuAl_{50}/CrTi_{10}/CoCr_{37}/CoPt_{11}Cr_{20}B_7$ | 3040 | 0.375 | 0.66 | 27.6 |
| 2 | $CrTa_{50}/RuAl_{50}/CrTi_{10}/CoCr_{37}/CoPt_{11}Cr_{20}B_7$ | 3660 | 0.420 | 0.80 | 27.7 |
| 3 | $NiAl_{50}/CrV_{20}/CoCr_{37}/CoPt_{10}Cr_{20}B_6$ | 3400 | 0.420 | 0.78 | 26.4 |
| 4 | $AlTi_{50}/RuAl_{50}/CrTi_{10}/CoCr_{37}/CoPt_{11}Cr_{20}B_7$ | 3500 | 0.430 | 0.81 | 27.7 |

The data in table 1 shows that although disks 1 and 2 have a comparable SoNR, disk 2 with a $CrTa_{50}$, i.e., 50 at. % Ta, pre-seed layer exhibits a substantially higher Hc and coercive squareness S*. At the same Mrt (remanent magnetization times thickness) as disk 3, disk 2 gives rise to a SoNR improvement of 1.3 dB as compared to the $NaAl_{50}$ seed layer structure of disk 3. Disk 4, which was made with an $AlTi_{50}$ pre-seed layer, also shows an improved performance over the prior art $NiAl_{50}$ (disk 3). The high coercivity and squareness achieved with CrTa and AlTi pre-seed layers is a result of creating the enhanced RuAl <100> and in-plane Co <$11\bar{2}0$> textures.

Figure 3:
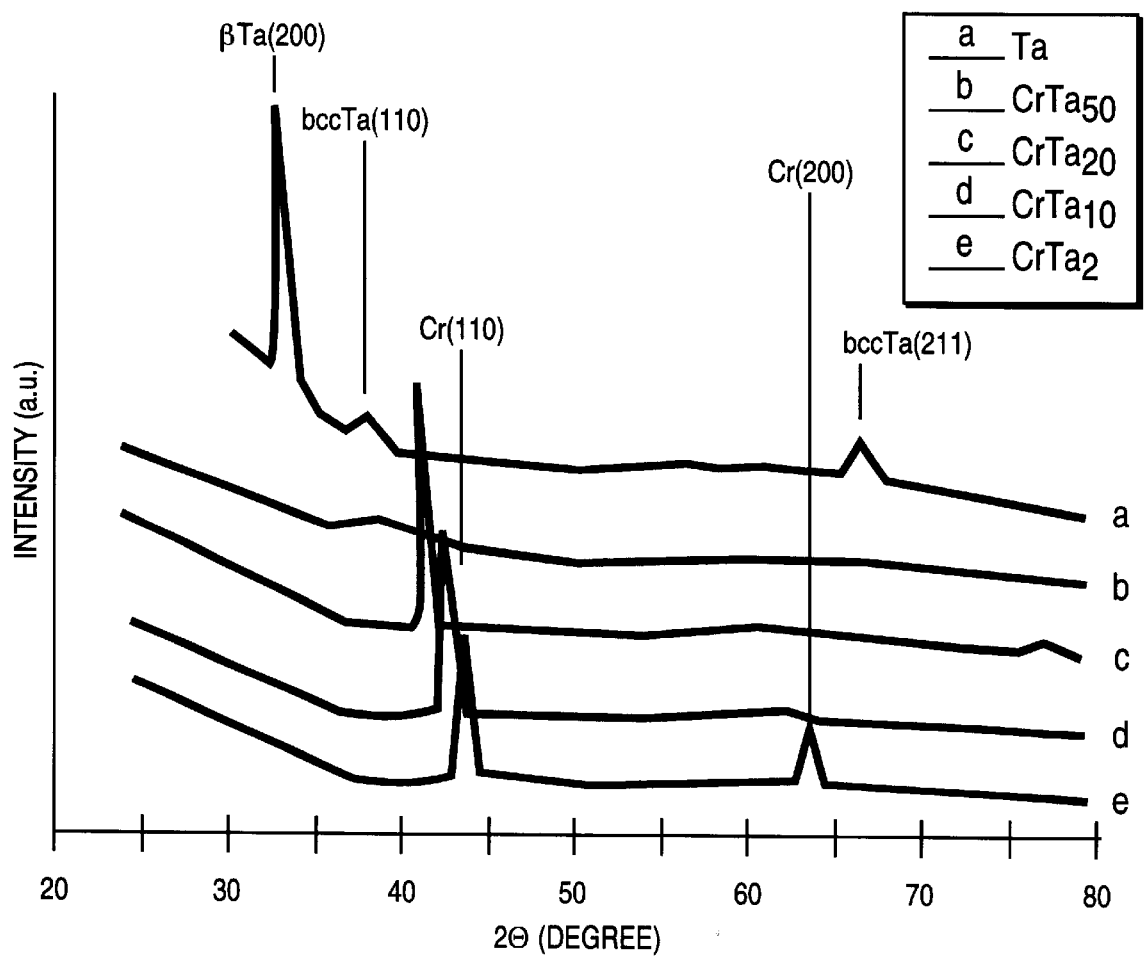
FIG. 3 is a graph illustrating the x-ray diffraction data for various samples of a magnetic disk drive showing the structural variations of CrTa with changes in composition.

FIG. 3 is a graph illustrating the X-ray diffraction data for various samples of a magnetic disk drive showing the structural variations of CrTa with different changes in composition. The figure shows spectra for a set of film structures with $CrTa_{50}$, $CrTa_{20}$, $CrTa_{10}$, $CrTa_2$ and Ta only pre-seed layers. No significant peaks appear for the $CrTa_{50}$ film indicating that this composition results in a substantially amorphous or nanocrystalline film. Both the pure Ta and $CrTa_{20}$ films result in significant diffraction peaks indicating crystalline structure.

Figure 4:
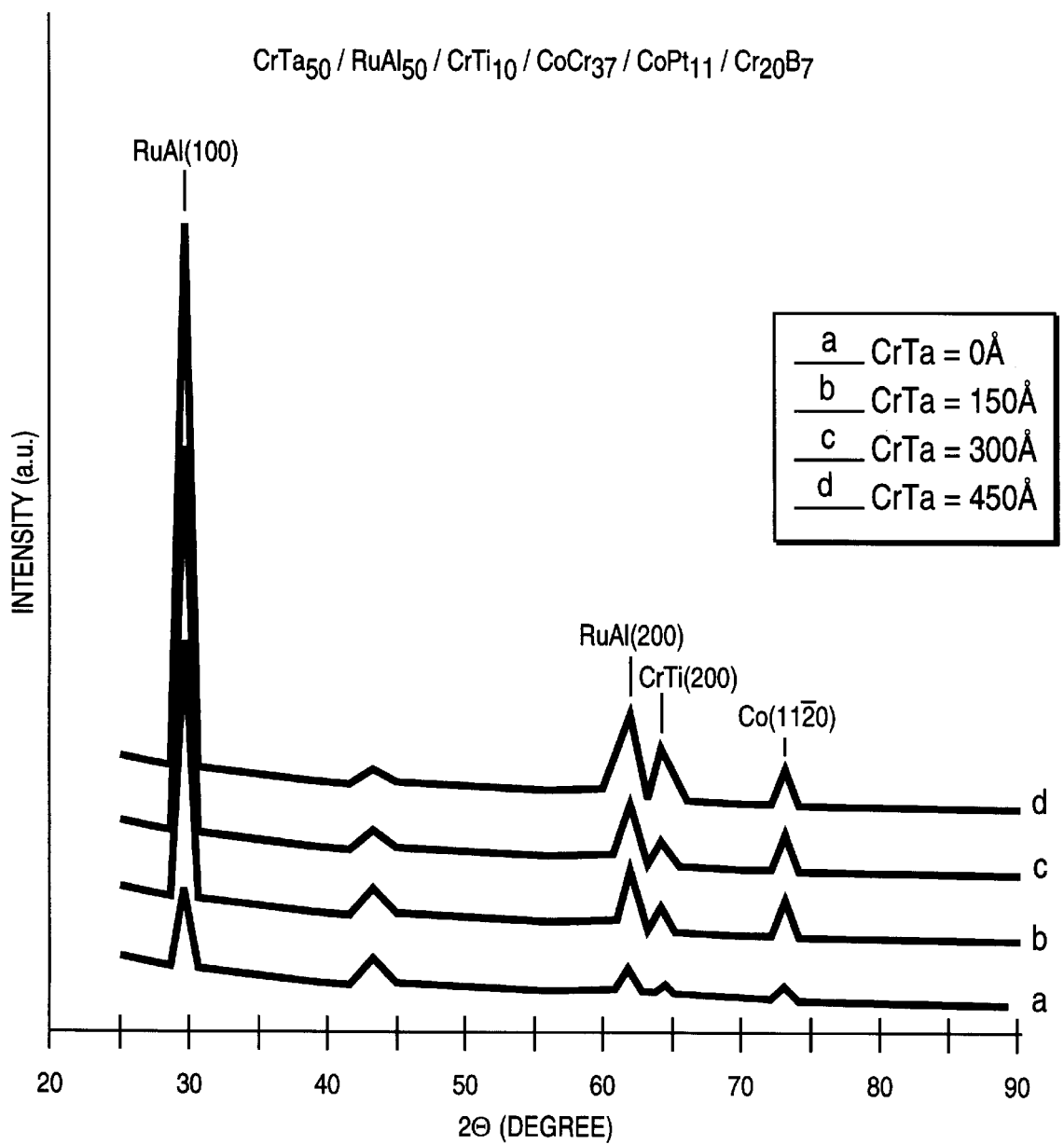
FIG. 4 is a graphical illustration showing x-ray diffraction data for samples of thin film magnetic disks showing the structural variations of materials with changes in thickness of a $CrTa_{50}$ pre-seed layer according to the invention.

FIG. 4 is a graphical illustration showing X-ray diffraction data for samples of thin film disks made with varying thickness of $CrTa_{50}$ pre-seed layers ranging from 0 to 45 nm. The results are believed to be consistent up to a thickness of 60 nm. Throughout the X-ray spectra no crystalline CrTa diffraction peaks are observed, thus confirming the amorphous nature of the pre-seed layer. As is known to those of ordinary skill in the art, the use of RuAl seed layer on glass substrate creates a Cr <200> texture, which leads to a <$11\bar{2}0$> texture in the Co-alloy layer. For a film structure without the CrTa pre-seed layer, all the diffraction peak intensities are very weak, indicating poor structural integrity due to the deposition of very thin RuAl seed layer and CrTi underlayer directly on glass. By depositing a CrTa pre-seed layer, substantial enhancements of RuAl (100), (200), CrTi (200) and Co-alloy ($11\bar{2}0$) diffraction peaks are observed, indicating a significant improvement of the C-axis in-plane orientation.

Figure 5:
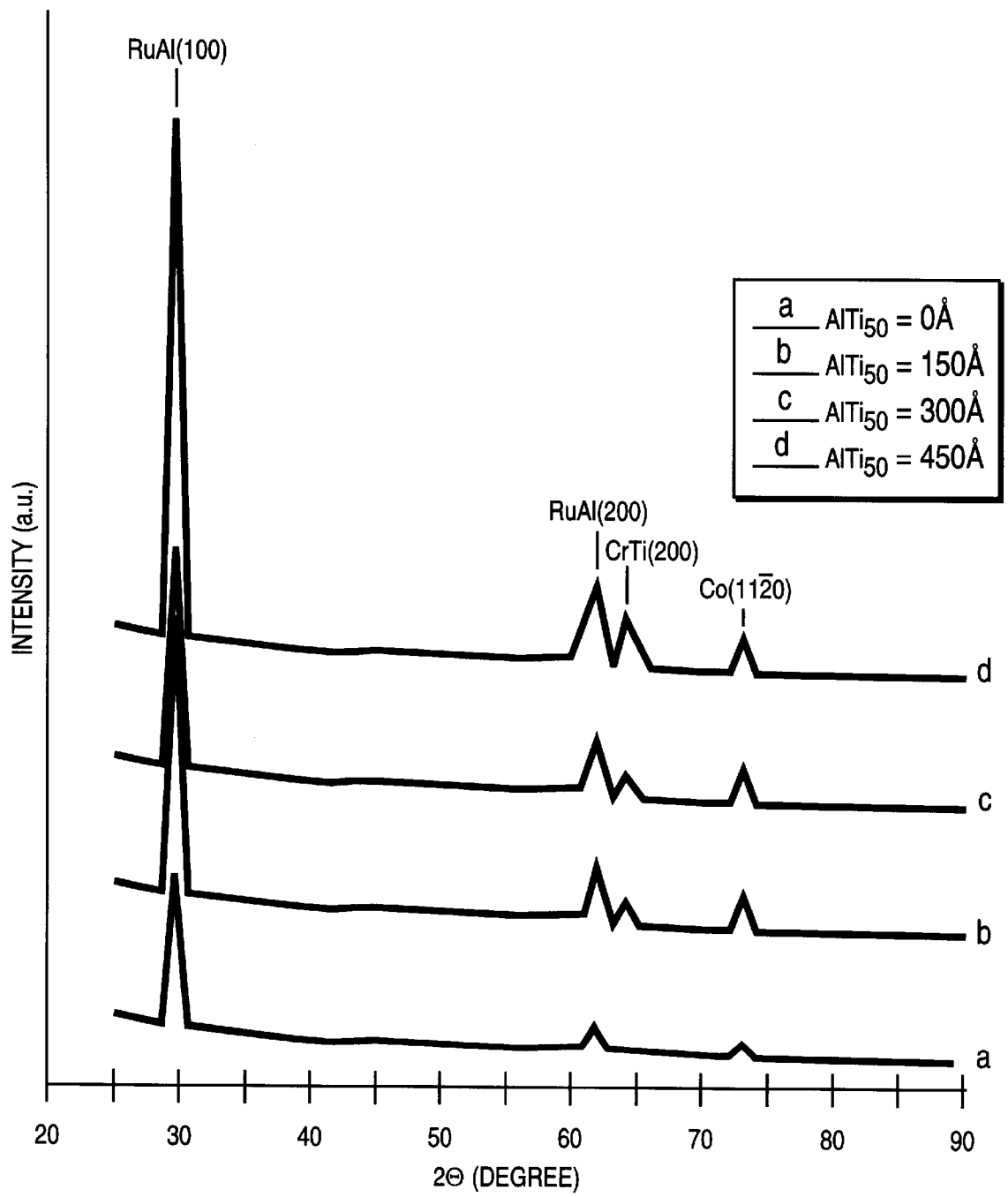
FIG. 5 is a graphical illustration showing x-ray diffraction data for samples of thin film magnetic disks showing the structural variations of the materials with changes in thickness of a $AlTi_{50}$ thin film layer according to a preferred embodiment of the present invention.

FIG. 5 shows X-ray diffraction plots for disks made with 0, 150, 300 and 450 Angstroms of thicknesses of $AlTi_{50}$ pre-seed layers. The results are believed to be valid down to a thickness of 100 Angstroms (A), i.e. 10 nm. The disks had RuAl seed layers, CrTi underlayers and cobalt alloy magnetic layers. The graph shows that the preferred orientations of RuAl (100), RuAl (200), CrTi (200) and Co (11$\bar{2}$0) strengthen with increased thickness of the AlTi pre-seed layer. As shown in FIG. 3 the preferred composition for the CrTa pre-seed layer is CrTa$_{50}$. The behavior of AlTi is similar to CrTa in this respect, so the preferred composition for an AlTi is also 50—50.

Table 2 summarizes the values of full width half-maximum (FWHM) derived from the RuAl (200) and Co (11$\bar{2}$0) peaks. It is clear that the much smaller FWHM values are measured for the film structure with either CrTa$_{50}$ or AlTi$_{50}$ pre-seed layers. The smaller FWHM values indicate a high degree of in-plane texture and less dispersion of [11$\bar{2}$0] preferred orientation of the hexagonal Co structure.

TABLE 2

| Film structure | RuAl (200) (° F.WHM) | Co(11$\bar{2}$0)(° F.WHM) |
|---|---|---|
| RuAl$_{50}$/CrTi$_{10}$/CoCr/ | 17.6 | 12.8 |
| CrTa$_{50}$/CrTi$_{10}$/CoCr/CoPtCrB | 5.8 | 5.2 |
| AlTi$_{50}$/RuAl$_{50}$/CrTi$_{10}$/CoCr/CoPtCrB | 8.7 | 6.8 |
| AlTa$_{20}$/RuAl$_{50}$/CrTi$_{10}$/CoCr/CoPtCrB | 11.6 | 8.8 |

It is also known that the poor thermal conductivity of glass substrates can cause the recorded data bits to be thermally erased. The use of a relatively thick CrTa pre-seed layer could potentially have some advantage in addressing the thermal erasure issue related to a glass disk medium.

Use of sputtered NiP pre-seed layer together with a Cr sub-seed layer and a NiAl seed layer was published by Chen, Yen, Ristau, Ranjan. ("Effect of Cr sub-seed layer thickness on the crystallographic orientation of Co-alloy recording media on glass," IEEE Trans. Magn. 35, pp. 2637–2639 (1999). Their results showed that (11$\bar{2}$0) Co-alloy texture can be generated for thicker (>45 Å) Cr sub-seed layers, but the SNR was poor due to larger grain size. For thin Cr sub-seed layers, the use of the NiAl seed layer induces (10$\bar{1}$0) Co-alloy texture.

RuAl tends to form the B2 (cesium chloride) structure in a sputtered thin film. Small amounts of other materials could conceivably be added to RuAl without disrupting the critical B2 structure. The B2 structure is an ordered cubic structure that can be described as two interpenetrating simple cubic lattices where, for RuAl, Al atoms occupy one lattice and Ru atoms the other. RuAl has a lattice constant, which is close to that of Cr even though Cr has a bcc structure. RuAl tends to form smaller grain size than Cr due to the strong bonding between the Ru and Al atoms, which reduces atomic mobility during deposition.

The role of the RuAl layer of the preferred embodiment of invention is to ultimately control the orientation, grain size and grain size distribution of magnetic grains. The grain size and orientation achieved in a RuAl layer is propagated into the magnetic layer through epitaxial growth of properly selected subsequent layers including the magnetic layer. Whereas the traditional thin film magnetic disk has only three layers e.g., underlayer, magnetic layer and overcoat, the trend in the industry is towards using additional layers. The terminology for these additional layers has not become standardized, but in a descriptive sense, there may be pre-seed layers 12, seed layers 14, one or more underlayers 16, non-magnetic or magnetic onset layers 18, a plurality of magnetic layers 20 which may or may not have spacers layers separating them. In addition what is called the "substrate" 10 may in fact be multilayered material. In this context of proliferating layers, the RuAl seed layer can be effective in achieving the beneficial results described herein so long as it is deposited in the B2 structure and ahead of the magnetic layer. Thus, the RuAl seed layer in the preferred embodiment is intended to be the first non-amorphous layer to influence crystallographic orientation and grain size of subsequently deposited magnetic material.

In a preferred embodiment of the invention, the CrTa or AlTi pre-seed layer is sputter deposited onto the substrate (which may already have thin films on it) from targets composed substantially of (a) CrTa and preferably CrTa$_{50}$, or (b) AlTi and preferably AlTi$_{50}$. The RuAl seed layer 14 is deposited onto the pre-seed layer 12 by standard sputtering techniques.

In accordance with a preferred embodiment of the present invention, the magnetic layer 20 is an alloy of cobalt, which typically contains Pt and Cr and may contain additional elements such as tantalum and boron, e.g CoPtCrTa or CoPtCrB. A typical magnetic layer might comprise 12 to 20 at. % platinum, 16 to 20 at. % chromium and 6 to 10 at. % boron with cobalt forming the remainder of the magnetic layer.

As is known to those of ordinary skill in the art, KuV/kT<60 indicates low stability, where
Ku=Magnetocrystalline anisotropy,
V=Switching volume,
k=Boltzmann's constant; and
T=absolute temperature.

In order to improve stability of the magnetic disk, the whole ratio of KuV/kT needs to be raised. Raising of the ratio can be achieved by increasing magnetocrystalline anisotropy (Ku), which in turn raises coercivity (Hc) because Ku is a function of Hc. Thus, by raising Ku, coercivity is increased and so is stability of the magnetic disk. The following table illustrates the use of a higher concentration of Pt in the magnetic layer to increase Hc and also Ku resulting in an improved stability of the magnetic disk.

TABLE 3

| Magnetic Layer | Pt Concentration (at. %) | Remanent Coercivity (Oe) |
|---|---|---|
| A | 12 | 4000 |
| B | 14 | 4400 |
| C | 16 | 4800 |
| D | 18 | 4780 |
| E | 20 | 4900 |

Figure 6:
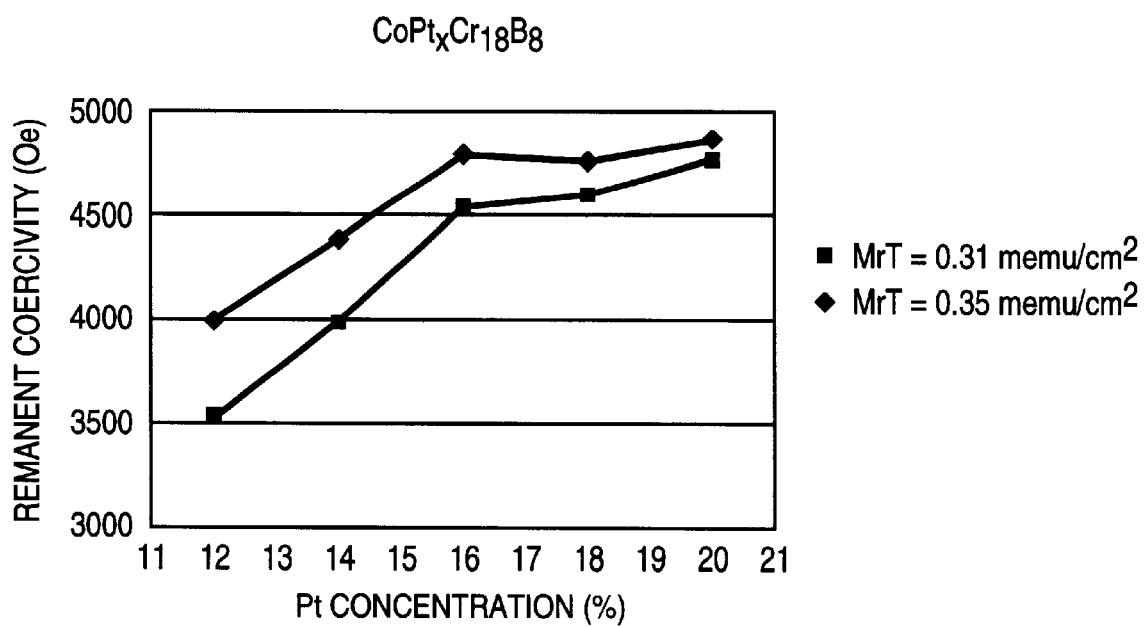
FIG. 6 is a graphical depiction of the relationship between remanent coercivity and varying concentrations of Pt in the magnetic layer.

A comparison of different magnetic layers with varying concentrations of Pt is presented in table 3. As can be understood from table 3, the presence of Pt in the magnetic layer has the tendency to raise the coercivity (Hc) of Co alloys and also magnetocrystalline anisotropy (Ku) of the magnetic layer. Therefore, a higher Pt concentration is generally used in the magnetic layer so as to raise Hc of the magnetic layer. The relationship between remanent coercivity and varying Pt concentrations in the magnetic layer is graphically depicted in FIG. 6 for two magnetic layers having differing MrT values. As depicted therein, the remanent coercivity Hc (Oe) of the magnetic layer 20 generally increases with an increase in the concentration of Pt in the magnetic layer for alloys containing 18 at. % Cr and 8 at. % boron. The difference in coercivity at different values of MrT is a measure of thermal stability and such difference indicates that the higher Pt concentration alloys are more thermally stable (less change in coercivity with MrT as Pt increases).

However, increasing the concentration of Pt in the magnetic layer beyond a certain range tends to result in the formation of stacking faults in the magnetic layer. Typically, spheres of atoms forming a crystal structure in any given layer of a disk are arranged in a single close packed layer A by placing each sphere in contact with six others. A second similar layer B is added by placing each sphere of atoms of layer B in contact with three spheres of the bottom layer. A face centered cubic (fcc) structure of a crystal is formed when the spheres of the third layer C are added over the holes in the first layer that are not occupied by layer B spheres to form a configuration of ABC, ABC. A hexagonal close packed (hcp) structure of a crystal is obtained when the spheres in the third layer are placed directly over the centers of the spheres in the first layer to form a configuration of AB, AB, AB. Where the Pt concentration in the magnetic layer is increased beyond 20 at. % stacking faults tend to appear in the magnetic layer resulting in a configuration of ABC, AB, AB, which is undesirable.

In order to circumvent these problems, boron is added to the magnetic layer. The addition of boron to the magnetic layer helps reduce stacking faults. Boron also helps in preventing the formation of the undesirable fcc crystal structure and helps in inducing hcp crystal structures, which are the desirable crystal structures. Boron also helps support a further increase in the concentration of Pt in the magnetic layer while still helping in maintaining an increase in coercivity of the magnetic layer.

Boron also helps to reduce the amount of magnetic exchange and coupling between grains in the magnetic layer. The magnetic cluster size in the media determines the level of noise. In the case where the grains are completely isolated magnetically from each other, the cluster size is equal to the grain size. When exchange coupling is present between grains, the magnetic cluster size increases and the SNR is degraded. Since Boron segregates to grain boundaries, it acts to reduce coupling between grains in the magnetic layer and improve SNR. Boron also improves SNR through decrease of the grain size in the magnetic layer.

An increase in the concentration of Pt in the magnetic layer allows more of boron to be dissolved in the crystal lattices of the magnetic layer. Therefore, the boron concentration in the magnetic layer can be increased, corresponding to increases in Pt concentration in the magnetic layer, without disrupting the epitaxial growth of the magnetic layer on the onset layer. In accordance with a preferred embodiment of the present invention, the composition of the magnetic layer is $CoPt_xCr_{18}B_y$ where x>4+y, and where x=at. % of Pt and y=at. % of boron.

Cr is a desirable component of the magnetic layer because it decreases noise due to its tendency to segregate grains in the magnetic layer. However, addition of Cr decreases Ku so it is desirable to use an optimal concentration of Cr needed to isolate the grains in the magnetic layer. Since boron and Cr have similar properties in regard to coupling, boron and Cr are added to the magnetic layer.

While the preferred embodiments of the present invention have been illustrated in detail, it will be apparent to the one skilled in the art that alternative embodiments of the invention are realizable without deviating from the scope and spirit of the invention.

What is claimed is:

1. A thin film magnetic disk comprising:
   a substrate;
   a pre-seed layer with an amorphous or nanocrystalline structure, said pre-seed layer being comprised of AlTa or AlTi;
   a non-magnetic ruthenium-aluminum (RuAl) seed layer deposited over the pre-seed layer;
   at least one non-magnetic underlayer deposited over the RuAl seed layer;
   at least one onset layer deposited over the underlayer; and
   at least one magnetic layer deposited over the onset layer, wherein said magnetic layer alloy is comprised of $CoPt_xCrB_y$, wherein x is the at. % concentration of Pt, y is the at. % concentration of boron, and x>4+y.

2. The disk of claim 1, wherein the Pt concentration in the magnetic layer is in the range of 12–20 at. %.

3. The disk of claim 1, wherein the Cr concentration in the magnetic layer is in the range of 16–20 at. %.

4. The disk of claim 1, wherein the boron concentration in the magnetic layer is in the range of 6 to 10 at. %.

5. The disk of claim 1, wherein the onset layer comprises an alloy of CoCr.

6. The disk of claim 1, wherein the pre-seed layer is AlTi and contains approximately 50 at. % Ti.

7. The disk of claim 1, wherein the pre-seed layer is AlTa and contains approximately 20 at. % Ta.

8. The disk of claim 1, wherein the thickness of the pre-seed layer is greater than or equal to 10 nm.

9. The disk of claim 1, wherein the thickness of the pre-seed layer is less than or equal to 60 nm.

10. The disk of claim 1, wherein the RuAl seed layer is between 3 and 20 nm in thickness.

11. The disk of claim 1, wherein the RuAl seed layer has a B2 structure.

12. The disk of claim 1, wherein the RuAl seed layer has a <200> preferred orientation.

13. The disk of claim 1, wherein the underlayer is a chromium alloy containing approximately 10 at. % titanium.

14. The disk of claim 1, wherein the underlayer comprises CrTi with a <200> preferred orientation.

15. The disk of claim 1, wherein the underlayer comprises CrTi and is between 3 and 15 nm in thickness.

16. A disk drive comprising:
    a motor for rotating a spindle;
    a thin film magnetic disk mounted on the spindle; and
    an actuator assembly including a head for writing magnetic information on the disk as it rotates, wherein said thin film disk includes:
    a substrate;
    a pre-seed layer with an amorphous or nanocrystalline structure, said pre-seed layer being comprised of AlTa or AlTi;
    a non-magnetic ruthenium-aluminum (RuAl) seed layer deposited over the pre-seed layer;
    at least one non-magnetic underlayer deposited over the RuAl seed layer;
    at least one onset layer deposited over the underlayer; and
    at least one magnetic layer deposited over the onset layer wherein said magnetic layer alloy is comprised of $CoPt_xCrB_y$, wherein x is the at. % concentration of Pt, y is the at. % concentration of boron, and x>4+y.

17. The disk drive of claim 16, wherein the Pt concentration in the magnetic layer is in the range of 12–20 at. %.

18. The disk drive of claim 16, wherein the Cr concentration in the magnetic layer is in the range of 16–20 at. %.

19. The disk drive of claim 16, wherein the boron concentration in the magnetic layer is in the range of 6 to 10 at. %.

20. The disk drive of claim 16, wherein the underlayer comprises CrTi with a <200> preferred orientation.

21. The disk drive of claim 16, wherein the underlayer comprises CrTi and is between 3 and 15 nm in thickness.

22. The disk drive of claim 16, wherein the pre-seed layer is AlTi and contains approximately 50 at. % Ti.

23. The disk drive of claim 16, wherein the pre-seed layer is AlTa and contains approximately 20 at. % Ta.

24. The disk drive of claim 16, wherein the thickness of the pre-seed layer is greater than or equal to 10 nm.

25. The disk drive of claim 16, wherein the thickness of the pre-seed layer is less than or equal to 60 nm.

26. The disk drive of claim 16, wherein the RuAl seed layer is between 3 and 20 nm in thickness.

27. The disk drive of claim 16, wherein the RuAl seed layer has a B2 structure.

28. The disk drive of claim 16, wherein the RuAl seed layer has a <200> preferred orientation.

29. The disk drive of claim 16, wherein the underlayer is a chromium alloy containing approximately 10 at. % titanium.

30. A method of manufacturing a thin film magnetic disk comprising the steps of:

depositing a pre-seed layer with an amorphous or nanocrystalline structure onto a substrate;

depositing a crystalline ruthenium-aluminum (RuAl) seed layer over the pre-seed layer, said pre-seed layer being comprised of AlTa or AlTi;

depositing at least one non-magnetic underlayer over the RuAl seed layer;

depositing at least one onset layer over the underlayer; and depositing at least one magnetic layer over the onset layer, wherein said magnetic layer alloy is comprised of $CoPt_xCrB_y$, wherein x is the at. % concentration of Pt, y is the at. % concentration of boron, and x>4+y.

31. The method of claim 30, wherein the Pt concentration in the magnetic layer is in the range of 12–20 at. %.

32. The method of claim 30, wherein the Cr concentration in the magnetic layer is in the range of 16–20 at. %.

33. The method of claim 30, wherein the boron concentration in the magnetic layer is in the range of 6 to 10 at. %.

34. The method of claim 30, wherein the underlayer is a chromium alloy containing approximately 10 at. % titanium.

35. The method of claim 30, wherein the underlayer comprises CrTi with a <200> preferred orientation.

36. The method of claim 30, wherein thickness of the onset layer is in the range of 0.5 to 2.5 nm.

37. The method of claim 30, wherein the pre-seed layer is AlTi and contains approximately 50 at. % Ti.

38. The method of claim 30, wherein the pre-seed layer is AlTa and contains approximately 20 at. % Ta.

39. The method of claim 30, wherein the thickness of the pre-seed layer is greater than or equal to 10 nm.

40. The method of claim 30, wherein the thickness of the pre-seed layer is less than or equal to 60 nm.

41. The method of claim 30, wherein the RuAl seed layer is between 3 and 20 nm in thickness.

42. The method of claim 30, wherein the RuAl seed layer has a B2 structure.

43. The method of claim 30, wherein the RuAl seed layer has a <200> preferred orientation.

44. The method of claim 30, wherein the underlayer comprises CrTi and is between 3 and 15 nm in thickness.

* * * * *